United States Patent [19]

Grundmann et al.

[11] 4,059,095
[45] Nov. 22, 1977

[54] DEVICE FOR UTILIZING THE HEAT ENERGY OF SOLAR RADIATION

[75] Inventors: Edgard Grundmann, Fallersleben; Herbert Heitland, Wolfsburg; Rudolf Kroll, Vorsfelde, all of Germany

[73] Assignee: Volkswagenwerk Aktiengesellschaft, Wolfsburg, Germany

[21] Appl. No.: 675,594

[22] Filed: Apr. 9, 1976

[30] Foreign Application Priority Data

Apr. 9, 1975  Germany .............................. 2515398
Sept. 11, 1975  Germany .............................. 2540495
Sept. 11, 1975  Germany .............................. 2540497

[51] Int. Cl.² .................................................. F24J 3/02
[52] U.S. Cl. .................................................... 126/271
[58] Field of Search ................................. 126/270, 271

[56] References Cited

U.S. PATENT DOCUMENTS

| 2,624,366 | 1/1953 | Pugh | 138/137 |
| 3,022,781 | 2/1962 | Andrassy | 126/271 |
| 3,039,453 | 6/1962 | Andrassy | 126/271 |
| 3,859,980 | 1/1975 | Crawford | 126/271 |
| 3,868,945 | 3/1975 | Konopka et al. | 126/271 |
| 3,871,033 | 3/1975 | Bartlett | 4/172.13 |

Primary Examiner—Carroll B. Dority, Jr.
Attorney, Agent, or Firm—Spencer & Kaye

[57] ABSTRACT

Device for producing usable heat from solar radiation comprising a carrier which is in heat conductive contact with a flowable heat carrier medium in a flexible conduit structure which has an inlet and an outlet and is on a surface of the carrier. The carrier is formed of a flexible material whereby the device including the conduit and the carrier is coilable into a roll.

27 Claims, 10 Drawing Figures

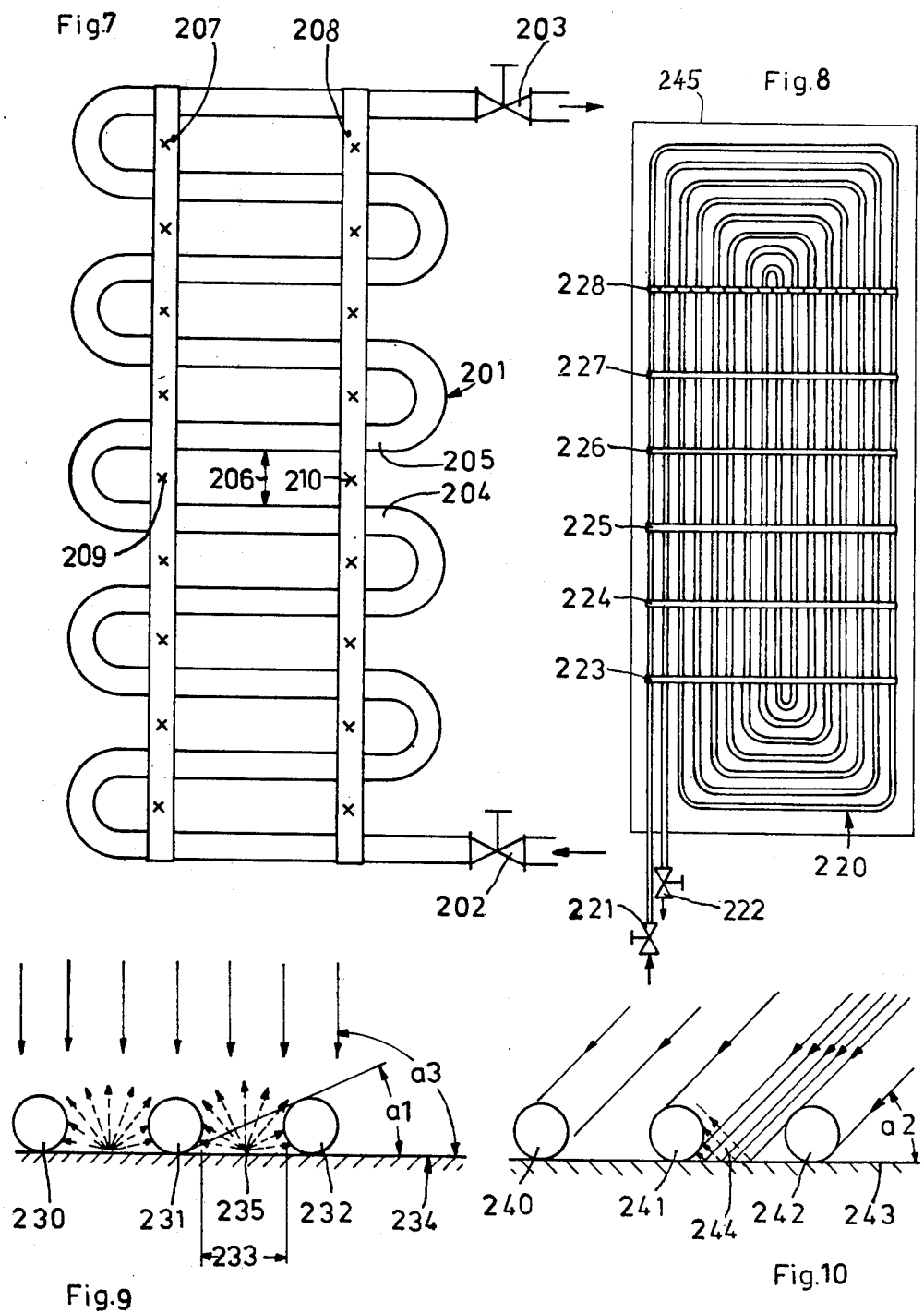

DEVICE FOR UTILIZING THE HEAT ENERGY OF SOLAR RADIATION

BACKGROUND OF THE INVENTION

This invention relates to a device for generating useful heat from solar radiations, including a black surface positioned on a support which is in heat conducting contact with a flowable heat carrying medium contained in a pipe conduit having an inlet and an outlet.

Known devices of this type include, as stationary equipment, a sheet metal plate which constitutes the carrier for a black surface and from which the heat is transmitted to water that contacts the underside of the sheet metal plate.

In the weekly periodical "VDI-Nachrichten" of July 4th, 1975, on pages 1 and 9, there is described a device for generating useful heat from solar radiation by means of black conduits accommodating a flowable heat carrier medium. The black conduits extend in jackets which are pervious to solar rays but which reduce heat transfer to the environment. More particularly, according to this publication, there are provided two absorber tubes with black glass enamel which are spaced from one another in an evacuated protective tube which is pervious to solar radiation and which at its upper portion, i.e., the portion oriented towards the sun has an inner heat reflecting filter, while its lower portion, which is oriented away from the sun, is provided with a silver mirror. One of the absorber tubes is provided for the inlet and the other for the outlet of the heat carrying water. A plurality of such arrangements are provided in a side-by-side contacting arrangement.

The above-outlined known device, although of high efficiency, is very expensive and further has the disadvantage that it is not portable: for shipment, the device must be disassembled.

SUMMARY OF THE INVENTION

It is a primary object of the invention to provide a portable device of the above-outlined type.

Such portable devices may find advantageous application, for example, in heating the water of a swimming pool on sunny days. A portable device for utilizing solar energy according to the invention may in general find further application in other fields for transforming the solar energy to heat energy, and may be occasionally coupled with further energy conversions.

This object and others which will become apparent are accomplished according to the invention in that, briefly stated, the carrier and the conduit are constituted by a flexible material so that the entire device may be coiled into a roll.

According to the preferred embodiment, the carrier itself has a black surface and is complemented to form a component of the pipe system. For example, the carrier may be constituted by a foil member (black foil) and may be complemented by means of a further foil into a coilable pipe system by means of connections which, in part, extend longitudinally to the outer edges in a sealing manner and in part extend between inlet and outlet to extend the flow path of the heat carrying medium. This embodiment of the portable device designed according to the invention thus resembles an air mattress which, after the fluid or air has been released therefrom, may be rolled up and transported in a simple manner without substantial spatial requirements.

Computations have shown that such a device designed according to the invention is capable, for example, of heating the water of a relatively small swimming pool by several degrees.

The incorporation of several measures may be expedient in increasing the degree of efficiency of the device. Thus, a substantial extension of the flow path is obtained by so arranging the connections between the foils that they alternately extend from one of the outer edges in the direction of the other outer edge and form, with the latter, an outlet for the flowing medium. The heat carrier medium may be a liquid such as water or may be a gas. It is further feasible to achieve heat insulation of the device itself by forming that surface of the device which faces the radiation source as an outer foil which is pervious to the radiation and which is connected with the remainder of the apparatus so as to form air chambers. In this case, expediently, the outer foil is made of a material which is poorly pervious to the radiation emitted by the black surface so as to achieve a greenhouse effect.

The use of foils is further particularly advantageous from the point of view of manufacturing technology since, as known, foils made of synthetic material may be welded to one another in a fluid tight manner. In some cases it is thus possible to make the connections between all of the foils in a single operation.

A further object of the invention is to provide a device of the type described above with black conduits in jackets which is economical to manufacture and which can be transported without disassembly.

Thus, according to another embodiment of the invention, the conduits and the jackets are formed by a flexible hose having at least two radially successive and superimposed layers with the inner — and thinner — layer having being black and the outer thicker — layer being made of a material that is pervious to solar radiation.

Since the structure according to the invention is formed merely of a flexible hose system which is connected to means for storing heat, all that is needed for transporting the apparatus is to roll up the hose system. It is further feasible to hold the hose system tautly by means of a support on a base such as an inclined roof, in a meander-like manner. Such a support need not be removed necessarily for shipment, particularly if it is formed of flexible bands. In this manner, a mat-like device is obtained which may be rolled up similar to a rug.

According to a further feature of the invention, the conduits are formed by length regions, or portions, of a flexible hose, with the relative position of the length portion being secured by holding means. These holding means may be stationary hooks or the like. The assembly can then be rolled up in a known manner for shipping. Advantageously, the holding means form a portable unit together with the hose permitting the unit to be rolled up. Holding means permitting coiling of the hose assembly in a rug-like or mat-like manner have a number of structural possibilities. Thus, the holding means may be rigid rod-like components which are arranged parallel to one another and perpendicular to the direction of coiling. The holding means are then coiled together with the hose assembly and in the coiled condition there is obtained a structure which is rigid in the direction of the rod-like components of the holding means.

The holding means of the type outlined in the preceding paragraph may be disadvantageous if the device covers a very large surface. In such a case it is particularly expendient if the support means are comprised of bands which extend in the direction of coiling. These bands then form hinge-like connections between the successive length regions or portions of the hose. According to a particularly advantageous structure, the bands are combined into double bands which enclose the length regions of the hose between themselves and whose individual bands are connected together in the spaces between adjacent length regions. Particularly if the bands are made of plastic foils, these connections will be made by welding or adhesives.

Understandably there are also a number of possibilities for the hose configuration. Thus the hose may be held in a meanderlike arrangement by the holding means. It is also possible for the hose to form a spiral-like arrangement, in which case, according to a further feature of the invention the hose may be bifilar.

The fact that adjacent length regions of the hose do not directly contact one another but enclose a space therebetween only seemingly indicates additional space requirement. These spaces not only permit the establishment of connections between the associated rods or bands, respectively in the area of these spaces if double rods or double bands are used as the holding means, but they also prevent, at least for certain positions of the sun, adjacent length regions of the hose from casting shadows on one another. Thus care should be taken that the holding means keep the length regions at a mutual spacing which is measured, with a view toward preventing mutual shading of adjacent length regions, during a given period of time.

It is also possible to utilize, by additional measures, the portions of solar radiation which impinge in the spaces to heat the length regions of the black hose. Thus the device may be provided with a black base whose heat radiation will then effect additional heating of the length regions of the hose at least over a major portion thereof. This additional heating is understandably greatest when the solar radiation impinges perpendicularly. In another embodiment the device is provided with a reflecting support. The effectiveness of reflected solar radiation with respect to additional heating of the length regions of the hose is least if the solar radiation impinges perpendicularly. It increases with decreasing height of the sun, although with decreasing height of the sun the radiation density also decreases.

The cited state of the art includes, as described above, evacuated protective tubes which surround the black tubes or conduits in a spaced arrangement and these protective tubes at least reduce the dissipation of heat from the black tubes due to environmental conditions. Such a protection can be attained in the present invention without a reduction in the good portability of the same in that the device is provided, at least on one side, with a covering foil which is pervious to sun radiation, i.e., generally a transparent foil. Such an embodiment provides that the covering foil forms a sack-type receptacle for the hose where the length regions of the hose are in the given relative position. Thus the mat-like arrangement formed by the hose and the support means is "sacked" or "bagged" so to speak in the cover foil which is pervious to solar radiation.

It is also possible to design the cross section of the hose material itself to consist of several layers so that the above-mentioned heat dissipation to the environment is at least reduced. For example, as indicated above, the hose material may have a two-layer cross section of which the inner, thinner, layer is black and the outer, thicker, layer is transparent. In this case the above-described covering foil may possibly be eliminated.

BRIEF DESCRIPTION OF THE DRAWINGS

FIGS. 7 and 8 are top views of two further embodiments of the invention.

FIGS. 9 and 10 are schematic sectional views of embodiments of the invention illustrating a further feature thereof.

DETAILED DESCRIPTION OF THE INVENTION

Figure 1:
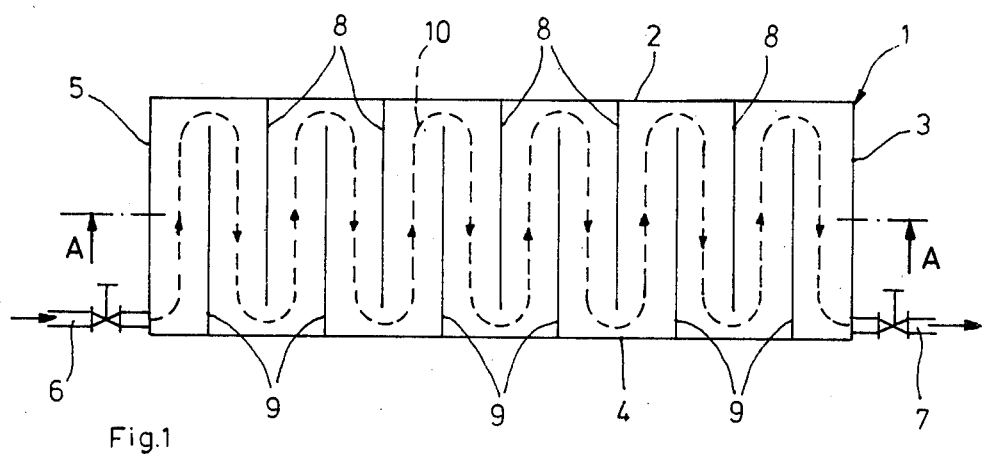
FIG. 1 is a schematic top view of one embodiment of the basic device of the present invention.

Referring now to FIG. 1, there is shown a top view of a portable device 1, which is rectangular in this particular embodiment and which is composed of at least two foils of material, one of which may be considered to be a carrier. The two foils are connected together in a fluid tight manner by respective connections which extend along edges 2 to 5 of the arrangement so that the heat carrier medium entering at 6 via an inlet valve and exiting at 7 via an outlet valve will find a sealed conduit structure between the two foils forming device 1. In order to extend the effective length of the conduit, further connections 8 and 9 between the two foils extend in alternating sequence from one of the two longitudinal edges 2 and 4 in the direction toward the opposite longitudinal edge 4 or 2, respectively, with the ends of these connections facing the other respective longitudinal edge ending at a relatively small distance before this longitudinal edge. The resulting interconnected space between the two foils thus defines a flow path for the heat carrier medium so that as a whole a meander-like flow path, which is indicated by the dashed line 10, is formed.

Figure 2:
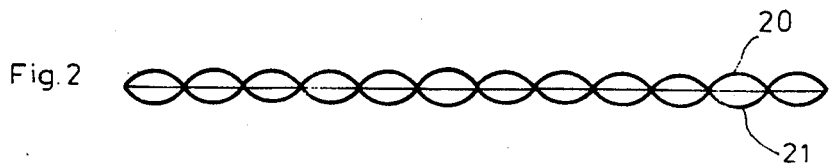
FIGS. 2 to 5 are sectional views along the line A-A of the embodiment of FIG. 1 showing various modifications of the basic device.

According to the embodiment of the basic device of FIG. 1 shown in FIG. 2, the device 1 is formed by two foils 20 and 21 which are connected together according to the scheme of FIG. 1, for example, by welding. At least the upper or outer surface of foil 20 is a black surface which is the reason why foil 20 is called the black foil. Advisably the other foil 21 is also provided with a black outer surface since then the device 1 can be used in any position.

Figure 3:
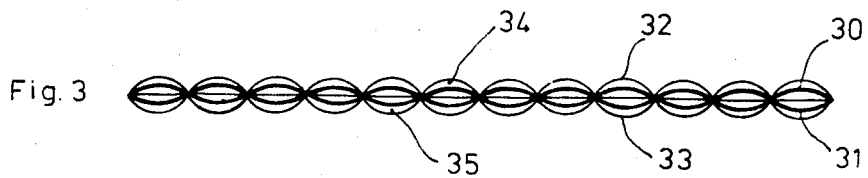

While in the embodiment of FIG. 2 only two foils are provided, the embodiment of FIG. 3 includes, in addition to the two black foils 30 and 31, (corresponding to the foils 20 and 21 of FIG. 2) two outer foils 32 and 33 which are formed of a material pervious to radiation and which are connected with the two black foils 30 and 31 so as to form air chambers 34 and 35 around the conduit. In this case all four foils can be held together by the same weld connections so that the arrangement of FIG. 3 can likewise be manufactured in a single process step. As in the embodiment of FIG. 2, the heat exchange medium in the structure of FIG. 3 flows through the conduit structure formed between the two foils 30 and 31.

Figure 4:
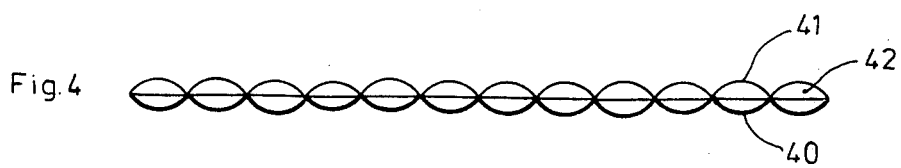

In the embodiment of FIG. 4, which is particularly simple, the black foil 40, which has at least one black surface and which in FIG. 4 is the top or inner surface, is again connected by welds with a foil 41 which is pervious to radiation so that the radiation will initially penetrate foil 41 and the heat carrier medium 42 before it impinges on the black surface of black foil 40. Understandably it would be possible to provide a further radiation pervious foil such as foil 32 of FIG. 3 above foil 41, thus forming insulating air chambers.

Figure 5:
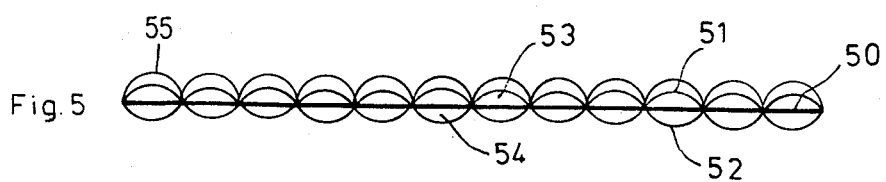

A modification of the arrangement of FIG. 4 is shown in FIG. 5. In this embodiment, the black foil 50 which has at least one black surface, the top or upper surface in FIG. 5, is covered on both sides with a foil 51 and 52, respectively, which are pervious to radiation, and with the connections of foils 51 and 52 with the black foil 50 each defining flow paths or channels 53 and 54 respectively in the manner of flow path 10 of FIG. 1. As with the embodiment of FIG. 4, insulating air chambers can be formed adjacent at least the one of the conduits 53 and 54 which faces the radiation source, e.g. by providing a further radiation pervious foil 55 above foil 51. If care is taken that these flow channels 53 and 54 are components of otherwise separate flow circuits, the arrangement of FIG. 5 can be used as a heat exchanger. It may possibly also be sufficient to have only one of channels 53 and 54 as part of a flow circuit while the other channel constitutes a closed system.

Particularly if care is taken that the various connections marked 2 to 5 and 8 and 9 in FIG. 1 are appropriately oriented, i.e., that connections between the foils extending in the longitudinal direction are avoided wherever possible (e.g. other than the connections along the longitudinal edges 2 and 4), it is easily possible to roll up the device 1 of the invention after the heat carrier medium has been discharged from the conduit or flow path. Thus, and due to the low weight of the arrangement, it is easily possible to transport the device 1 even to difficult accessible locations, for example, onto a roof. Good results have been achieved with foils from polyvinylchloride (PVC) or polyethylene (PE).

Figure 6:
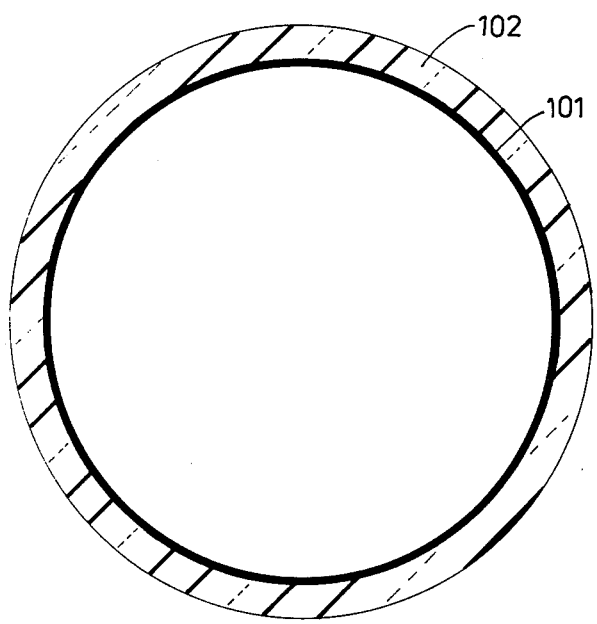
FIG. 6 is a cross-sectional view of a hose which can be used for the conduit structure of a device according to the invention.

Instead of forming the device according to the invention of two foils as in FIGS. 1–5, as shown in FIG. 6, the conduit may be formed of a flexible hose which comprises two superposed layers 101 and 102 with the thinner, inner, layer 101 being black, while the thicker, outer, layer 102 consists of a transparent material. The solar radiation is substantially absorbed in the thinner, black inner layer 101 and the resulting heat is transferred inwardly to the flowing heat carrier medium, preferably water. The heat loss of the inner, black layer 101 from radiation, conduction and convection is at least substantially reduced by the transparent, thicker, outer layer 102.

A further advantage of this embodiment of the invention is that the hoses, for example, garden hoses, can be made of known materials as well as plastics. It is also possible to produce the inner black layer by a dyed interior zone of the material of the outer layer.

In FIG. 7 the hose which is generally identified with 201 and is provided with an inlet valve 202 and an outlet valve 203 and is intended for water, for example, forms a meander-like configuration. Between adjacent length regions of the hose, for example between the length regions marked 204 and 205, a given spacing 206 is maintained whose dimensions will be discussed below.

The various length regions of hose 201 are held in their relative positions by a carrier or holding means. Although, if desired, the holding means could simply be a sheet or foil of material which acts as a carrier and on whose surface the hose is mounted, as shown in FIG. 7, these holding means are here formed by two pairs of flexible double bands 207 and 208 (only the upper band of each pair being shown in the figure) which extend in the coiling direction of the device. Thus the mat-like device of FIG. 7 can be rolled vertically upwardly. Each double band 207 or 208 thus includes two bands which are made, for example, of plastic foils and which face one another with respect to the configuration plane of hose 201. In the area of the spaces between adjacent length regions or portions of hose 201, i.e., for example in space 206 between the length regions 204 and 205, the individual pairs of double bands 207 and 208 are connected together as indicated at 209 and 210, respectively, for example by welding or by an adhesive, so that each double band forms eye-like receptacles for the length regions of hose 201.

If desired, the connections 209 and 210 for the double bands 207 and 208 may be snaps. Additionally, the holding means may be formed, if desired, by two collecting tubes with an inlet and an outlet between which length regions of the hose are arranged in a parallel direction with openings to thhe collecting tubes.

In the embodiment according to FIG. 8, the hose generally identified as 220, which again is provided with valves 221 and 222 at its inlet and outlet, is fixed in a spiral-like manner by holding means 223 to 228, six in this embodiment. Here again the holding means 223-228 are each a double band arrangement with connections being made in the spaces between successive length regions of hose 220 between the individual bands forming a double band as indicated here only with respect to double band 228. However, contrary to the embodiment of FIG. 7, in the embodiment of FIG. 8 the holding means are each rigid bar or rod-like members which are arranged substantially parallel to each other and perpendicular to the direction of winding or coiling of the device, i.e., the vertical direction in FIG. 8.

A further feature of the embodiment of FIG. 8 is that the hose 220 is wound in a bifilar manner, i.e., both ends of the hose 220 lie at the outer end of the spiral. Understandably the present invention also includes an arrangement in which the hose is wound singly, i.e., one of its ends lies on the inside of the spiral.

In FIG. 9, again a plurality of length regions 230, 231 and 232 of a flexible hose are arranged and held next to one another, e.g., according to the embodiment of FIG. 7. As indicated with respect to the length regions 231 and 232 which between themselves enclose space 233, length region 231 will be shaded by length region 232 or generally the various length regions of the black hose will shade one another only when the solar radiation impinges on base or carrier 234 at an angle $a1$. Thus the spaces between adjacent length regions should be selected large enough so that such shading is avoided during a given period of time. On the other, the spaces in question should of course be as small as possible so that the space requirement for the device is as small as possible or with identical space requirement, as long a hose as possible can be accommodated.

In order to increase the effectiveness of the device, the spaces between the various length regions of the hose in the embodiment of FIG. 9 are utilized in that a black base 234 is provided from which heat radiates due to its black color. If a point 235 on base 234 is considered, where base 234 may be constituted by a black roof, made for example of tar paper, this point radiates heat in an approximately semicircular distribution of which a major portion impinges on the adjacent length regions 231 and 232 thus additionally heating them. This heat radiation from the black surface 234 also reaches the normally shaded portions of the length regions of the hose and is greater the higher the position of the sun, i.e., has its maximum with an incidence at the angle a3.

In the embodiment of FIG. 10 the spaces between adjacent length regions 240, 241 and 242 of the hose are also utilized by suitable selection of base 243 to additionally heat the black hose. In this embodiment, base 243 is made reflecting so that when the sun radiates at an angle, indicated by the angle a2, additional heating results for the sections of length regions 240, 241 and 242 of the hose which face the sun. This is indicated at 244. This additional heating has its minimum when the sun radiation is vertical, i.e., at noon. When the sun is very low, the reduction in radiation intensity will of course have an adverse effect. In any case this additional heating due to reflection from base 243 acts in the sense of keeping the quantity of heat obtained constant over a certain time period which includes the noon hour while the arrangement of FIG. 9 with a black base 234 has its greatest effect, as described above, when the sun is in a vertical position.

Understandably the base, be it black (234) or reflecting (243), can constitute at least part of the holding means or carrier so that then the hose is fastened directly to the base.

In particular, when a black base is used, care must be taken that a good heat contact is provided between the hose on the one hand and the base on the other hand.

Regarding again FIG. 8, number 245 designates a cover foil pervious to solar radiation and forming a sack-like receptacle for the hose.

It will be understood that the above description of the present invention is susceptible to various modifications, changes and adaptations, and the same are intended to be comprehended within the meaning and range of equivalents of the appended claims.

We claim:

1. A device for producing usable heat from solar radiation and which is coilable into a roll comprising in combination:
    a first elongated flexible foil having at least one black surface;
    a first fluid flow conduit formed by a second flexible foil of a material which is pervious to solar energy positioned adjacent said one surface of said first foil with said first foil and said second foil being connected together in a fluid tight manner, along the outer edges to define a first closed space therebetween, first inlet means and a first outlet means, each communicating with said first closed space, for permitting the flow of a fluid heat carrier medium through said first space, and further sealing connections of said first foil to said second foil positioned to define an extended fluid flow path, within said first closed space, between said first inlet means and said first outlet means; and
    a second fluid flow conduit formed by a third flexible foil positioned adjacent the surface of said first foil opposite said one surface with said first foil and said third foil being connected together, in a fluid tight manner, along their outer edges to define a second closed space therebetween, second inlet means and second outlet means, each communicating with said second closed space, for permitting the flow of a separate fluid heat carrier medium through said second space, and further sealing connections of said first foil to said third foil positioned to define an extended fluid flow path, within said second space, between said second inlet means and said second outlet means.

2. A device as defined in claim 1 wherein: said first foil is rectangular and at least said first inlet means and said first outlet means are situated at opposite edges of said first foil; and at least said further sealing connections of said first foil to said second foil extend, in substantially parallel lines, from one of the outer edges of said first foil toward the respective opposite outer edge in an alternating sequence and terminate a short distance from said respective opposite outer edge, to thereby form a meander-type conduit for the passage of a fluid heat carrier medium between at least said first inlet means and said first outlet means.

3. A device as defined in claim 1 wherein said third foil is pervious to solar radiation.

4. A device as defined in claim 1 further comprising a further outer foil which is pervious to solar radiation positioned adjacent the outer surface of at least the foil of the device which faces the radiation source and connected with the adjacent outer surface of the adjacent foil so as to form air chambers between said outer foil and the adjacent foil.

5. A device as defined in claim 1 wherein said foils are plastic foils and said connections are weld connections.

6. A device for producing usable heat from solar radiation comprising in combination: a conduit for a flowable heat carrier medium, said conduit being a flexible hose having at least a pair of layers of material which are successive in the radial direction and lie on top of one another, the inner layer of said pair of layers being relatively thin and being black and the outer layer of said pair of layers being thicker and being made of a material which is pervious to solar radiation, said hose being arranged in a desired planar configuration with adjacent portions of the length of said hose being spaced and generally parallel to one another;
    inlet and outlet means connected to the respective ends of said hose; and
    holding means for maintaining said hose in said desired planar configuration while permitting said device to be coilable into a roll.

7. A device as defined in claim 6 wherein said holding means include a carrier of flexible sheet material having said conduit mounted on one surface thereof.

8. A device as defined in claim 6 wherein said holding means include rigid, rod-like members which are arranged parallel to one another and perpendicular to the direction of coiling of said device.

9. A device as defined in claim 6 wherein said holding means include flexible bands which extend in the direction of coiling of said device.

10. A device as defined in claim 9 wherein the connections between the bands of a pair of bands are welds or adhesive connections.

11. A device as defined in claim 6 wherein said hose is held by said holding means in a meander-like configuration.

12. A device as defined in claim 6 wherein said hose is held by said holding means in a spiral-like configuration.

13. A device as defined in claim 12 wherein said hose is in a bifilar spiral-like configuration.

14. A device as defined in claim 6 wherein the device further includes a cover foil on at least one side thereof, which is pervious to solar radiation.

15. A device as defined in claim 14 wherein said cover foil forms a sack-like receptacle for said hose wherein said parallel portions of said hose are in said given relative positions.

16. A device as defined in claim 6 wherein said holding means maintains said parallel portions of said hose at a mutual spacing which is such as to avoid mutual shading of adjacent said parallel portions of said hose during a given period of time during the day.

17. A device as defined in claim 16 wherein said holding means includes a flexible carrier having a planar surface on which said hose is mounted and said surface is black.

18. A device as defined in claim 16 wherein said holding means includes a flexible carrier having a planar surface on which said hose is mounted and said surface is a reflecting surface.

19. A device as defined in claim 6 wherein said outer layer of said hose is transparent.

20. A device as defined in claim 19 wherein said black inner layer is a dyed region of the same material as said outer layer.

21. A device as defined in claim 6 wherein said holding means comprise pairs of bands with the bands of said pair being disposed on opposite surfaces of said planar configuration and being connected together in the spaces between adjacent parallel portions of the length of said hose.

22. A device as defined in claim 21 wherein said bands are rigid, rod-like members which are arranged parallel to one another and perpendicular to the direction of coiling of said device.

23. A device as defined in claim 21 wherein said bands are flexible bands which extend in the direction of coiling of said device.

24. A device as defined in claim 6 wherein said spacing between adjacent parallel portions of the length of said hose is such as to avoid mutual shading of said adjacent parallel portions of said hose during a given period of time of day.

25. A device as defined in claim 24 further comprising a substantially planar base, with said planar conduit configuration being disposed on one surface of said base.

26. A device as defined in claim 25 wherein said one surface of said base is black.

27. A device as defined in claim 25 wherein said one surface of said base is a reflective surface.

* * * * *